United States Patent
Krishna et al.

(10) Patent No.: US 11,632,442 B2
(45) Date of Patent: Apr. 18, 2023

(54) INTERACTIVE PRODUCTION ALERTS DASHBOARD

(71) Applicant: CERNER INNOVATION, INC., Kansas City, KS (US)

(72) Inventors: Akkaladevi Vijay Krishna, Karnataka (IN); Pravat Santra, Karnataka (IN); Chirag Bharatia, Karnataka (IN); Ravishankar Nagesh, Karnataka (IN); Nese Manjunatha, Karnataka (IN); Eric Abraham Kalloor, Karnataka (IN)

(73) Assignee: CERNER INNOVATION, INC., Kansas City, MO (US)

( * ) Notice: Subject to any disclaimer, the term of this patent is extended or adjusted under 35 U.S.C. 154(b) by 0 days.

(21) Appl. No.: 17/199,630

(22) Filed: Mar. 12, 2021

(65) Prior Publication Data

US 2021/0409515 A1  Dec. 30, 2021

Related U.S. Application Data

(60) Provisional application No. 63/046,090, filed on Jun. 30, 2020.

(51) Int. Cl.
*H04L 67/75* (2022.01)

(52) U.S. Cl.
CPC .................... *H04L 67/75* (2022.05)

(58) Field of Classification Search
CPC ............ G06Q 10/0635; G06Q 10/0833; G06F 21/552; G06F 16/95; H04L 41/22; H04L 41/0631; H04L 63/1425; H04L 63/1433; H04L 63/1416; H04L 41/0604; H04L 43/045; H04L 67/32; H04L 63/0807; H04L 29/0899; H04L 41/0253; H04L 41/5074; H04L 67/36; H04L 9/3213; H04L 41/0686; H04L 41/14; H04L 41/5064; H04L 1/0061; H04L 43/04
USPC .......................................... 709/224
See application file for complete search history.

(56) References Cited

U.S. PATENT DOCUMENTS

| | | | |
|---|---|---|---|
| 10,728,121 B1* | 7/2020 | Chitalia | H04L 41/22 |
| 11,245,777 B1* | 2/2022 | Czerwinski | G06F 3/0482 |
| 2013/0030856 A1* | 1/2013 | Johnson | G06Q 10/06311 |
| | | | 705/7.15 |

(Continued)

*Primary Examiner* — Jeffrey R Swearingen
(74) *Attorney, Agent, or Firm* — Invoke

(57) ABSTRACT

Methods, computer systems, and computer storage media are provided that provide an interactive web-based alerts system. The system provides a combination of features including a mail application and a dashboard for reporting. Initially, automated emails sent from a plurality of sources are received and stored in a database. The automated emails are classified based on criteria including source, subject line, acknowledgement, and/or status. Using these classifications, various reports can be generated to provide insight into the alert quality and quantity. A dashboard interface displays the classified alerts and enables various interactions with the classified plurality of alerts. Based on the interactions, the dashboard interface is automatically updated, in real-time. In some embodiments, the interactions comprise causing an incident to be created for the alert, causing a category of the alert to be updated, or causing a shift report to be generated.

18 Claims, 11 Drawing Sheets

(56) References Cited

U.S. PATENT DOCUMENTS

2013/0103973 A1* 4/2013 Werth .................... H04L 67/34
714/2
2015/0381405 A1* 12/2015 Male .................. H04L 41/5074
709/223
2021/0200393 A1* 7/2021 Wohlstadter .......... G06F 3/0485

* cited by examiner

500 — Report Based on DL's

| Oncall DL | Total Mails | Status | | | FLE Status | |
|---|---|---|---|---|---|---|
| | | Unacknowledged | Acknowledged | Pending | Resolved | |
| DL_CSM_APP_ONCALL | 28 | 0 | 28 | 0 | 28 | |
| DL_CSM_DBA_ONCALL | 98 | 1 | 97 | 0 | 97 | |
| DL_CTS_ES_FLE_Backups_Oncall | 3 | 0 | 3 | 0 | 3 | |
| DL_CTS_ES_FLE_CorpSS_Oncall | 0 | 0 | 0 | 0 | 0 | |
| DL_CTS_ES_FLE_NETWORK_Oncall | 2 | 0 | 2 | 0 | 2 | |
| DL_CTS_CSM_FRONTLINE@cerner.com | 0 | 0 | 0 | 0 | 0 | |
| DL_CTS_INFRA_DEL_CORP_SS_ALERTS | 0 | 0 | 0 | 0 | 0 | |
| Other | 80 | 5 | 75 | 0 | 75 | |
| Total | 211 | 6 | 205 | 0 | 205 | |

FIG. 5

600 — CSM_APP_ONCALL Report Based on Subject line

| Subject line contains | Total Mails | Status | | | FLE Status | |
|---|---|---|---|---|---|---|
| | | Unacknowledged | Acknowledged | Pending | Resolved | |
| Disk space | 2 | 0 | 2 | 0 | 2 | |
| Information | 4 | 0 | 4 | 0 | 4 | |
| URL Down | 4 | 0 | 4 | 0 | 4 | |
| CERN_C_EH | 1 | 0 | 1 | 0 | 1 | |
| Advisory | 2 | 0 | 2 | 0 | 2 | |
| --Unspecified-- | 18 | 0 | 15 | 0 | 15 | |
| Total | 31 | 0 | 28 | 0 | 28 | |

FIG. 6

700 — Report Based on Associates

| Associate Name | No of Issues | | Min to Resolve | | |
|---|---|---|---|---|---|
| | | < 10 min | < 15 min | > 20 min | |
| Unacknowledged | 6 | --- | --- | --- | |
| John Smith | 106 | 13 | 6 | 87 | |
| Jane Robinson | 99 | 13 | 11 | 75 | |
| Total | 211 | 26 | 17 | 162 | |

SO FLE report

SO_FLE <sofle@cerner.com>
To ○ Krishna,Vijay; ⊞DL_SSE_ES_SERVICEOPS_LEADERS_INDIA ○ Bhattacharya,Adri
ⓘ If there are problems with how this message is displayed, click here to view it in a web browser

12 Hour report

Report Based on DL's

| Oncall DL | Total Mails | Status | | FLE Status | | |
|---|---|---|---|---|---|---|
| | | Unacknowledged | Acknowledged | Pending | Resolved | |
| DL_CSM_APP_ONCALL | 34 | 1 | 33 | 0 | 33 | |
| DL_CSM_DBA_ONCALL | 141 | 4 | 137 | 0 | 137 | |
| DL_CTS_ES_FLE_Backups_Oncall | 2 | 0 | 2 | 0 | 2 | |
| DL_CTS_ES_FLE_CorpSS_Oncall | 0 | 0 | 0 | 0 | 0 | |
| DL_CTS_ES_FLE_NETWORK_Oncall | 0 | 0 | 0 | 0 | 0 | |
| DL_CTS_CSM_FRONTLINE@cerner.com | 1 | 0 | 1 | 0 | 1 | |
| DL_CTS_INFRA_DEL_CORP_SS_ALERTS | 122 | 1 | 121 | 0 | 121 | |
| Other | | | | | | |
| Total | 300 | 6 | 294 | 0 | 294 | |

Report Based on Associates

| Associate Name | No of Issues |
|---|---|
| Unacknowledged | 6 |
| Anandu O A | 1 |
| Manoj H | 280 |

INTERACTIVE PRODUCTION ALERTS DASHBOARD

CROSS-REFERENCE

This application claims the benefit of U.S. Provisional Application No. 63/046,090 filed Jun. 30, 2020 which is incorporated herein by reference in its entirety.

BACKGROUND

In a healthcare setting, a healthcare facility relies upon various applications, device, and the like to provide mission critical information that may affect the services it provides to its staff, its patients, and others. For example, client applications which are hosted and deployed on a server must be available without any downtime. However, these servers are often prone to have issues in providing full availability for various reasons such as disk-space, network, database issues, and the like. Each of these issues can be monitored and controlled by agents that collect information such as real-time CPU, memory, disk space, and network interface usage.

Current systems utilize a variety of monitoring tools to monitor various aspects of the server(s). As alerts provided by these tools are often critical, a 24/7 team of engineers is often required to monitor and resolve alerts as they are provided in real-time. However, current systems rely on electronic mail applications to monitor and resolve issues corresponding to the alerts. A major drawback of these systems is redundant effort because several members of the 24/7 team may attempt to resolve the same issue because there is currently no tracking or ability to determine which alerts are pending or whether another member of the 24/7 team is already working on the issue corresponding to the alert. As a result, other alerts may go unresolved and the production system may suffer from unnecessary downtime.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing an interactive web-based alerts system. More particularly, the system provides a combination of features including a mail application and a dashboard for reporting. Initially, automated emails (i.e., a plurality of alerts) sent from a plurality of sources are received and stored in a database. In some embodiments, the plurality of alerts correspond to one or more of: CPU, memory, disk space, or network interface usage. The plurality of alerts may be redirected in real-time. In some embodiments, the plurality of alerts is redirected based on an automated script that is scheduled by the user.

The automated emails are classified based on criteria including source, subject line, acknowledgement, and/or status. In some embodiments, the one or more categories comprises: a pending status, a resolved status, an acknowledged status, or an unacknowledged status. Using these classifications, various reports can be generated to provide insight into the alert quality and quantity. A dashboard interface displays the classified alerts and enables various interactions with the classified plurality of alerts. Based on the interactions, the dashboard interface is automatically updated, in real-time.

In some embodiments, an interaction causes a report to be generated. The report may be automatically generated based on a business requirement. In some embodiments, an interaction causes an incident to be created for the alert. In some embodiments, an interaction causes a category of the alert to be updated. In some embodiments, the interaction causes a shift report to be generated for the user.

BRIEF DESCRIPTION OF THE SEVERAL VIEWS OF THE DRAWINGS

The present invention is described in detail below with reference to the attached drawing figures, wherein:

FIGS. 3-13 depict illustrative screen displays, in accordance with embodiments of the present invention.

DETAILED DESCRIPTION

Figure 1:
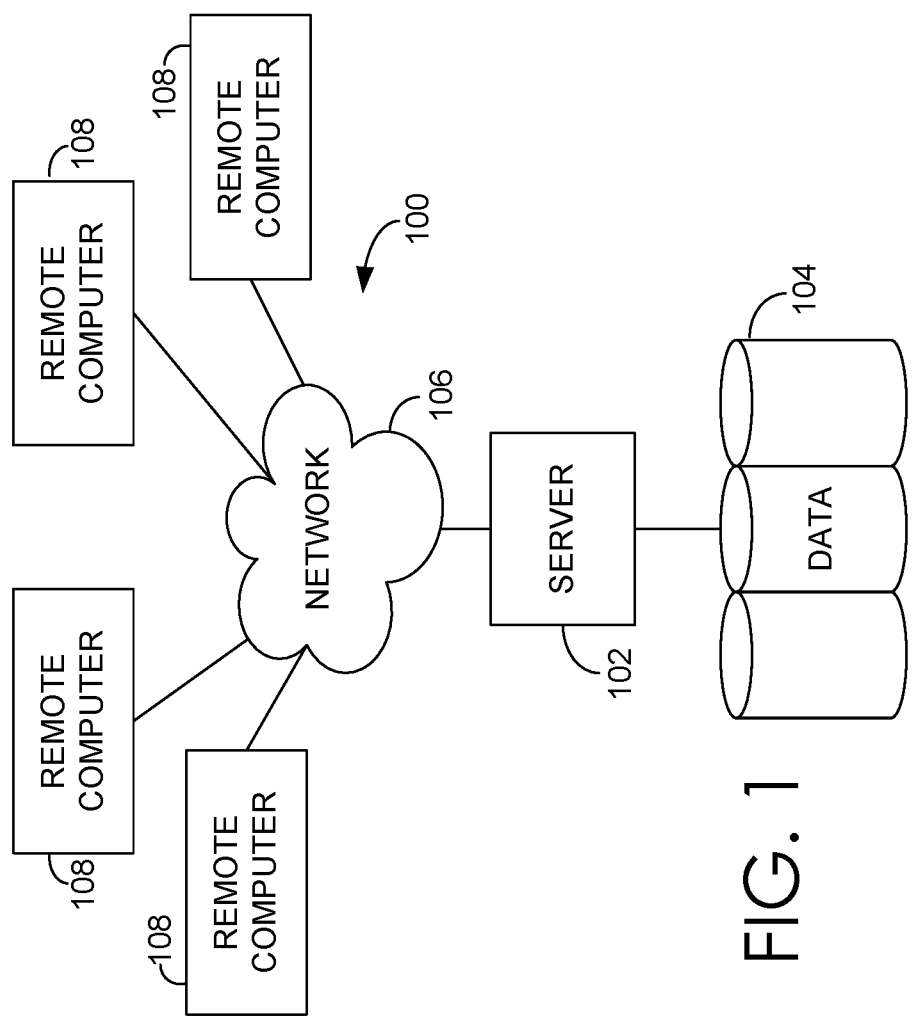
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As noted in the Background, healthcare facilities rely upon various applications, device, and the like to provide mission critical information that may affect the services it provides to its staff, its patients, and others. The applications, which are hosted and deployed on a server, must be available without any downtime. However, servers are often prone to have issues in providing full availability for various reasons such as disk-space, network, database issues, and the like. Each of these issues can be monitored and controlled by agents that collect information such as real-time CPU, memory, disk space, and network interface usage.

Current systems utilize a variety of monitoring tools to monitor various aspects of the server(s). As alerts provided by these tools are often critical, a 24/7 team of engineers is often required to monitor and resolve alerts as they are provided in real-time. However, current systems rely on electronic mail applications to monitor and resolve issues corresponding to the alerts. A major drawback of these systems is redundant effort because several members of the 24/7 team may attempt to resolve the same issue because there is currently no tracking or ability to determine which alerts are pending or whether another member of the 24/7 team is already working on the issue corresponding to the alert. As a result, other alerts may go unresolved and the production system may suffer from unnecessary downtime.

Embodiments of the present invention relate to providing an interactive web-based alerts system. The system provides a combination of features including a mail application and a dashboard for reporting. Initially, automated emails sent from a plurality of sources are received and stored in a database. The automated emails are classified based on criteria including source, subject line, acknowledgement, and/or status (e.g., pending or resolved). Using these classifications, various reports can be generated to provide insight into the alert quality and quantity.

In embodiments, the interactive web-based alerts system provides the look and feel of an e-mail application and enables a user to readily reply to an email or alert. Dashboard-like features of the interface provide an intuitive approach and facilitate granular reporting. Moreover, alert quality, alert turnaround time, incident management, and accountability are all significantly improved using embodiments of the present invention. For example, the interactive web-based alerts system can be integrated with an incident management system.

In some embodiments, the interactive web-based alerts system provides a monitoring solution through which alerts can be monitored in real-time with granular level reporting based on various filters. Additionally or alternatively, the interactive web-based alerts systems provides a reporting solution which sends out shift report e-mails in real-time to required stakeholders. The user interface of the interactive web-based alerts systems provides significant improvement over interfaces of conventional systems by providing one-stop navigation through all features (e.g., the monitoring solution, the reporting solution, etc.). Features of the interactive web-based alerts systems enable, for example, administrators to readily identify the impact of migrations or changes.

To illustrate the improvements, prior to the present invention, all e-mails and/or alerts were accessed through an e-mail solution and were segregated by different folders. In the present system, all e-mails and/or alerts can be accessed through a centralized database. Moreover, no reporting features were previously readily available in convention systems. With the present system, reports can be viewed in the dashboard and daily/weekly e-mails can be sent in a timely manner. Additionally, in conventional systems, users had to maintain a separate spreadsheet or list to track alerts they were working on. In the present system, the generation of associate-based shift reports is facilitated within the dashboard and alert turn-around time can easily be mapped. In conventional systems, incidents had to be created manually through a ticketing tool. The present system enables incidents to be created with the click of a button using APIs that have been integrated into the dashboard.

In these ways, the dashboard of the interactive web-based alerts system overcomes the manual process for generating reports that was previously required. By enabling live reporting, administrators can easily monitor e-mail and user activity at any given point in time. Moreover, the dashboard enables data to be visually depicted to facilitate making the data readily understood by administrators and leadership.

Accordingly, in one aspect, an embodiment is directed to one or more computer storage media having computer-executable instructions embodied thereon that, when executed by a computer, causes the computer to perform operations. The operations automatically classifying, at the dashboard engine, the plurality of alerts, into one or more categories based on the status of each alert of the plurality of alerts. The operations also include providing, by the dashboard engine, a dashboard interface to one or more users, the dashboard interface displaying the classified plurality of alerts. The operations further include receiving, from a user of the one or more users at the dashboard interface, an interaction with an alert of the classified plurality of alerts. The operations also include, based on the interaction, automatically updating, in real-time, the dashboard interface being displayed to the one or more users.

In another aspect of the invention, an embodiment of the present invention is directed to a computerized method. The method includes automatically classifying, at the dashboard engine, the plurality of alerts, into one or more categories based on the status of each alert of the plurality of alerts. The method also includes providing, by the dashboard engine, a dashboard interface to one or more users, the dashboard interface displaying the classified plurality of alerts. The method further includes receiving, from a user of the one or more users at the dashboard interface, an interaction with an alert of the classified plurality of alerts, the interaction causing one or more of: a report to be automatically generated based on a business requirement, an incident to be created for the alert within an incident management system, a category of the alert to be updated, or a shift report to be generated. The method also includes, based on the interaction, automatically updating, in real-time, the dashboard interface being displayed to the one or more users.

In a further aspect, an embodiment is directed to a computerized system that includes one or more processors and a non-transitory computer storage medium storing computer-useable instructions that, when used by the one or more processors, cause the one or more processors to: automatically classify, at the dashboard engine, the plurality of alerts, into one or more categories based on the status of each alert of the plurality of alerts; provide, by the dashboard engine, a dashboard interface to one or more users, the dashboard interface displaying the classified plurality of alerts; receive, from a user of the one or more users at the dashboard interface, an interaction with an alert of the classified plurality of alerts; and based on the interaction, automatically update, in real-time, the dashboard interface being displayed to the one or more users.

Having briefly described embodiments of the present invention, an exemplary operating environment suitable for use in implementing embodiments of the present invention is described below. FIG. 1 provides an aspect of an example operating environment with which embodiments of the present invention may be implemented. The aspect of an operating environment is illustrated and designated generally as reference numeral 100.

Example operating environment 100 comprises a general purpose computing device in the form of a control server 102. Exemplary components of the control server 102 comprise a processing unit, internal system memory, and a suitable system bus for coupling various system components, including database cluster 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Control server 102 typically includes therein, or has access to, a variety of computer-readable media, for instance, database cluster 104. Computer-readable media can be any available media that might be accessed by control server 102, and includes volatile and nonvolatile media, as well as, removable and nonremovable media. Computer-readable media might include computer storage media. Computer storage media includes volatile and nonvolatile media, as well as removable and nonremovable media implemented in any method or technology for storage of information, such as computer-readable instructions, data structures, program modules, or other data. In this regard, computer storage media might comprise RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 102. Computer storage media does not comprise signals per se. Combinations of any of the above also may be included within the scope of computer-readable media.

The computer storage media discussed above and illustrated in FIG. 1, including database cluster 104, provide storage of computer-readable instructions, data structures, program modules, and other data for the control server 102. In some embodiments, data cluster 104 takes the form of a cloud-based data store, and in some embodiments is accessible by a cloud-based computing platform.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and providers' offices. Providers may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like.

The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Exemplary computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networked environment, program modules or portions thereof might be stored in association with the control server 102, the database cluster 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

In some embodiments, control server 102 is a computing system or platform made up of one or more computing devices. Embodiments of control server 102 may be a distributed computing system, a centralized computing system, a single computer such as a desktop or laptop computer or a networked computing system. Thus, in some embodiments, control server 102 comprises a multi-agent computer system with software agents.

Figure 2:
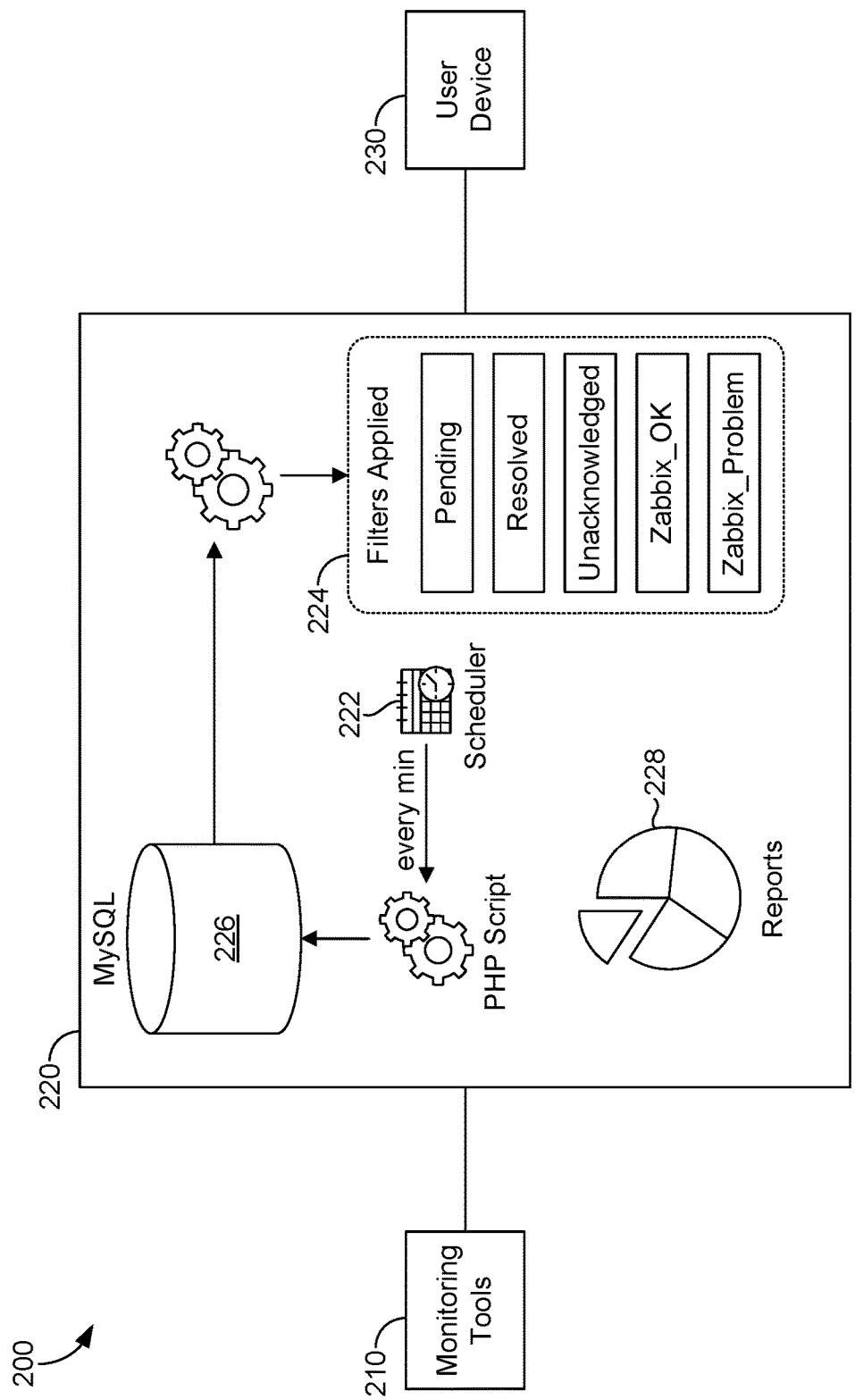
FIG. 2 is a block diagram of an exemplary system for creating and interacting with key notes, in accordance with an embodiment of the present invention.

Turning now to FIG. 2, an exemplary interactive web-based alerts system 200 is depicted suitable for use in implementing embodiments of the present invention. The interactive web-based alerts system 200 is merely an example of one suitable computing system environment and is not intended to suggest any limitation as to the scope of use or functionality of embodiments of the present invention. Neither should the interactive web-based alerts system 200 be interpreted as having any dependency or requirement related to any single module/component or combination of modules/components illustrated therein.

The interactive web-based alerts system 200 includes monitoring tools 210, dashboard engine 220, and user device 230, all in communication with one another via a network. The network may include, without limitation, one or more secure local area networks (LANs) or wide area networks (WANs). The network may be a secure network associated with a facility such as a healthcare facility. The secure network may require that a user log in and be authenticated in order to send and/or receive information over the network.

The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, dashboard engine 220 or components of dashboard engine 220 might reside on a server, cluster of servers, or a computing device remote from one or more of the remaining components. Although illustrated as a single system, components of dashboard engine 220, the functionality provided by each of these components might be provided as separate components/modules. The single unit depiction is meant for clarity, not to limit the scope of embodiments in any form.

Components of the interactive web-based alerts system 200 may include a processing unit, internal system memory, and a suitable system bus for coupling various system components, including one or more data stores for storing information (e.g., files and metadata associated therewith). Components of the interactive web-based alerts system 200 typically includes, or has access to, a variety of computer-readable media.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

User device 230 includes or has access to infrastructure that is capable of interacting with, for example, dashboard engine 220 and/or monitoring tools 210. The information received, displayed, and/or stored in association with user device 230 may include a dashboard interface, alerts, reports, incidents, shift reports, and the like created by dashboard engine 220. User device 230 may receive data from or communicate data to other systems (e.g., monitoring tools 210, monitoring and reporting systems, or incident management system, and the like), which may be integrated with interactive web-based alerts system 200 such that functionality provided by the other systems can be performed via the dashboard interface provided by interactive web-based alerts system 200.

User device 230 may be any type of computing device used within a healthcare facility or as part of monitoring and reporting systems or incident management systems to receive, display, and send information corresponding to alerts and/or incidents to another user or system. User device 230 may be capable of communicating via the network with monitoring tools 210 and/or dashboard engine 220. Such devices may include any type of mobile and portable devices including cellular telephones, personal digital assistants, tablet PCs, smart phones, and the like.

User device 230 is configured to display information to a user via a display. The information may include communications initiated by and/or received by dashboard engine 220. For example, user device 230 is configured to display user interfaces provided by dashboard engine 220, as described in more detail below. Embodiments are not intended to be limited to visual display but rather may also include audio presentation, visual presentation, combined audio/visual presentation, and the like.

Generally, the monitoring tools 210 comprises one or more sources that communicate automated e-mails to a specific mailbox. The automated e-mails represent alerts that correspond to components of a server or system being monitored by the one or more sources. For example, a monitoring tool may monitor one or more servers or other hardware components for CPU, disk space, memory, or network usage. Upon a particular threshold being met, the monitoring tool may communicate an automated e-mail to the specific mailbox.

Dashboard engine 220 is generally configured to provide an interactive web-based alerts system. Dashboard engine 220 provides a combination of features including a mail application and a dashboard for reporting. As the monitoring tools 210 communicate the automated e-mails to a mailbox, dashboard engine 220 automatically redirects the alerts (i.e., the automated e-mails) to a dashboard engine. The alerts may be redirected in real-time or by a scheduler 222 that schedules an automated script to retrieve the alerts. Dashboard engine 220 stores the plurality of alerts in database 226.

Dashboard engine 220 automatically classifies the alerts into one or more categories based on the status of each alert of the plurality of alerts. For example, dashboard engine may classify the alerts based on a pending status, a resolved status, an acknowledged status, or an unacknowledged status.

Dashboard engine 220 provides a dashboard interface that displays the classified alerts. Upon receiving an interaction with an alert from a user of the dashboard interface, the dashboard being displayed to all users is automatically updated in real-time. For example, the interaction may cause reports 228 to be generated. The reports may be automatically generated based on a business requirement. The interaction may cause an incident to be created for an alert. The interaction may cause a category of the alert to be updated. Or, the interaction may cause a shift report to be generated for the user.

With reference to FIGS. 3-13, illustrative screen displays 300, 400, 500 . . . 1300 of embodiments of the present invention are shown. It is understood that each of the illustrative screen displays are connected logically, such that they comprise a user interface designed for an interactive web-based alerts system. The screen displays may appear in any order and with any number of screen displays, without regard to whether the screen display is described or depicted herein. The screen displays provide tools that enable a user to interact with an alert in accordance with embodiments of the present invention.

Figure 3:
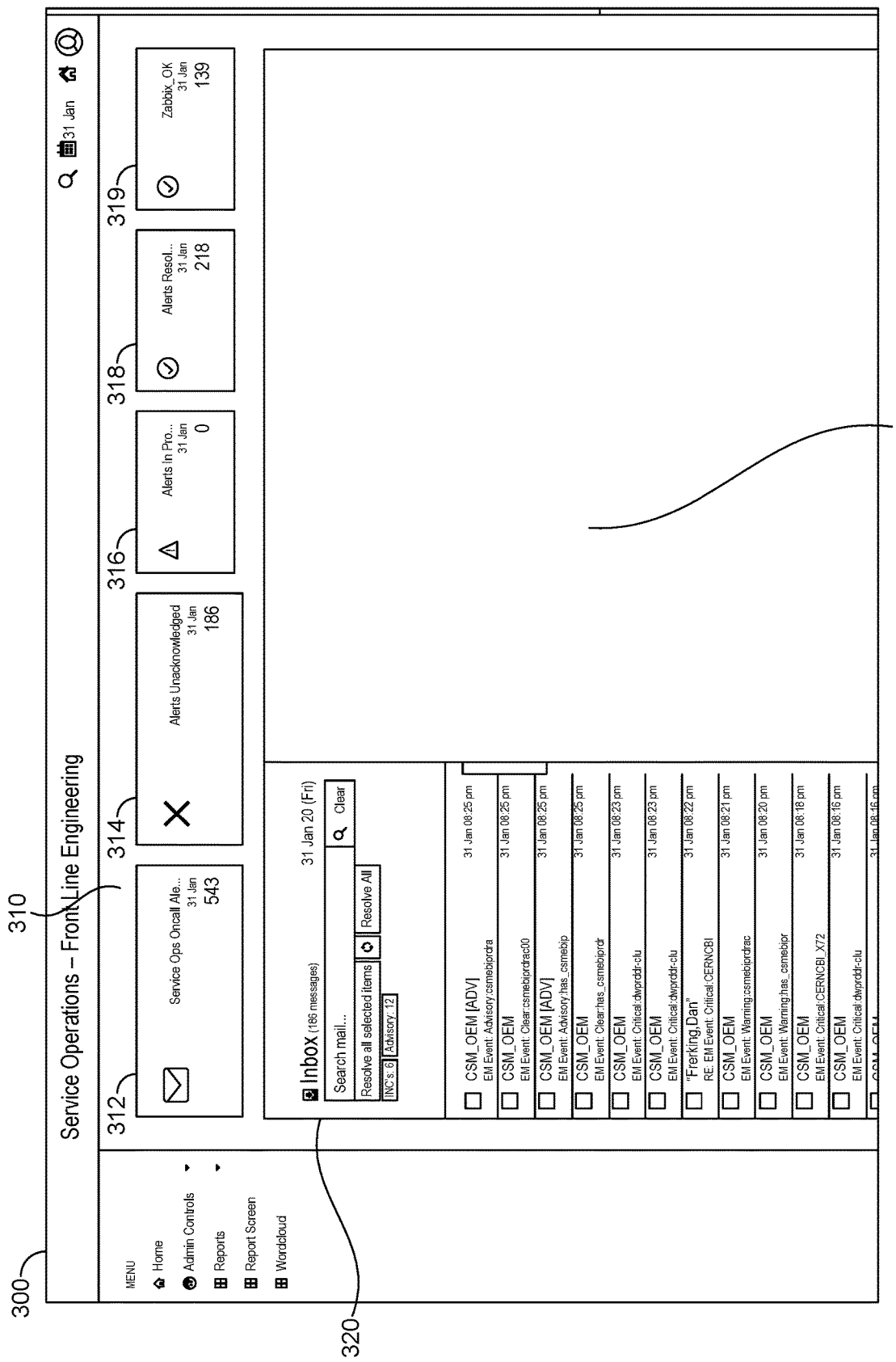

Referring initially to FIG. 3, user interface 300 depicts the homepage generated by the interactive web-based alerts system. As illustrated, the user interface 300 includes a dashboard 310, an inbox 320, and a details display 330. The dashboard 310 includes multiple areas to distinguish the current state of alerts. For example, the dashboard 310 includes a total number of alerts area 312 that indicates the total number of current alerts corresponding to the system(s) being monitored. The dashboard 310 also includes an unacknowledged alerts area 314 that indicates the number of current alerts that have not yet been acknowledged by a user. An alerts in progress area 316 indicates the number of alerts that are currently being addressed but have not yet been resolved. The dashboard 310 also includes a resolved alerts area 318 that indicates the number of alerts that have been addressed and marked as resolved. A monitoring tool area 319 may indicate the number of alerts identified by a particular monitoring tool.

The inbox 320 lists the individual emails that have been generated by the various monitoring tools or by the interactive web-based alerts system. Each email is tied to an identification number so any updates received for a particular alert can be propagated to corresponding emails. For example, suppose a user selects an individual alert from the inbox 320. The details area 330 provides the user with details corresponding to the alert. Additionally, the details area 330 enables the user to change the status of the alert to pending. That alert is then assigned to the user.

Another email may be generating acknowledging that the alert has been assigned to the user. Both the original alert and the acknowledgement email are tied to the same identification number. If the user decides to create an incident corresponding to the alert, the user can generate the incident from within the interactive web-based alerts system and assign an incident identification number for use within the incident management system.

Once the user has resolved a particular alert, the user can again select the particular alert and mark the alert as resolved in the details area 330. Moreover, because the interactions corresponding to the alert have the same identification number, the corresponding messages in the inbox 320 can be deleted or moved to another mailbox, and the user can find another alert to resolve. As users interact with the alerts, the dashboard 310 is updated in real-time for all users accessing the interactive web-based alerts system. This provides an up-to-date view of the actual status of alerts for all users so no duplicative or unnecessary work is performed.

Figure 4:
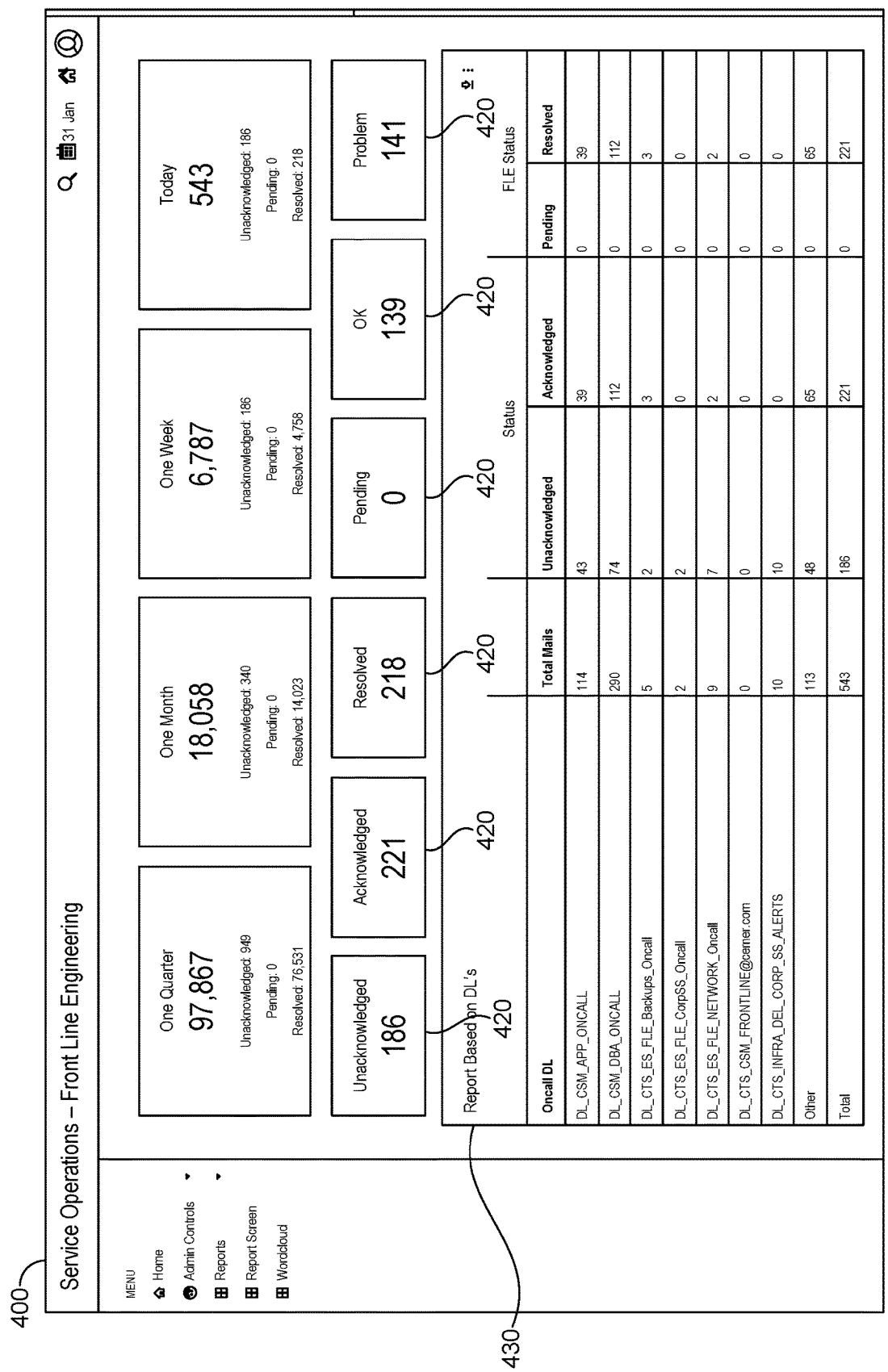

In FIG. 4, user interface 400 illustrates a dashboard generated by the interactive web-based alerts system. As illustrated, the user interface 400 includes an alerts by time period area 410, a status area 420, and a reports area 430. The alerts by time period area 410 indicates a number of alerts based on various time periods. For example, the alerts by time period area 410 may include alerts per quarter, alerts per month, alerts per week, or alerts for the current day. Additionally, the alerts by time period area 410 may include a status of the alerts for each time period. For example, a number of unacknowledged, pending, or resolved alerts may be identified for each time period.

Similar to the dashboard described with respect to FIG. 3, status area 420 includes multiple areas to distinguish the current state of alerts. For example, status area 420 includes an unacknowledged alerts area that indicates the number of current alerts that have not yet been acknowledged by a user. An acknowledged alerts area indicates the number of alerts that are currently being addressed but have not yet been resolved. The status area 420 also includes a resolved alerts area that indicates the number of alerts that have been addressed and marked as resolved. A pending area indicates the number of alerts that have some type of action pending. The status area 420 also includes an OK area that indicates the number of alerts that may not actually present any issues to the system(s) being monitored. A problem area may indicate the number of alerts have been escalated to another user or to an incident management system, where the interactive web-based alerts system creates an incident on behalf of the incident management system.

Turning now to FIG. 5, user interface 500 depicts a sample report based on the system being monitored. For example, the report identifies alerts that were addressed to applications engineers, database administrators, backup administrators, security administrators, network administrators, frontline engineers, and the like. The report may indicate the total number of emails corresponding to each alert, a status indicating whether the alert has been unacknowledged or acknowledged, and a frontline engineering status indicating whether the alert is pending or resolved.

Referring to FIG. 6, user interface 600 illustrates a sample report based on the subject line of the alerts. For example, the report identifies alerts that may indicate CPU, memory, disk space, network interface usage, and the like. The report may indicate the total number of emails corresponding to each alert, a status indicating whether the alert has been unacknowledged or acknowledged, and a frontline engineering status indicating whether the alert is pending or resolved.

In FIG. 7, user interface 700 depicts a sample report based on users. As illustrated, the report identifies a number of issues assigned to each user, including the issues that are currently unacknowledged. In addition to the number of issues, the user interface 700 also particular time period needed to resolve each of the issues. For example, user "John Smith" may have 106 issues assigned to him. As illustrated, 13 of the issues were resolved in less than ten minutes, 6 of the issues were resolved in less than 15 minutes, and 87 of the issues were resolved in greater than 20 minutes. By breaking the number of issues down into time periods needed to resolve, productivity, efficiency, and timeliness can be readily identified for each user.

Figure 8:
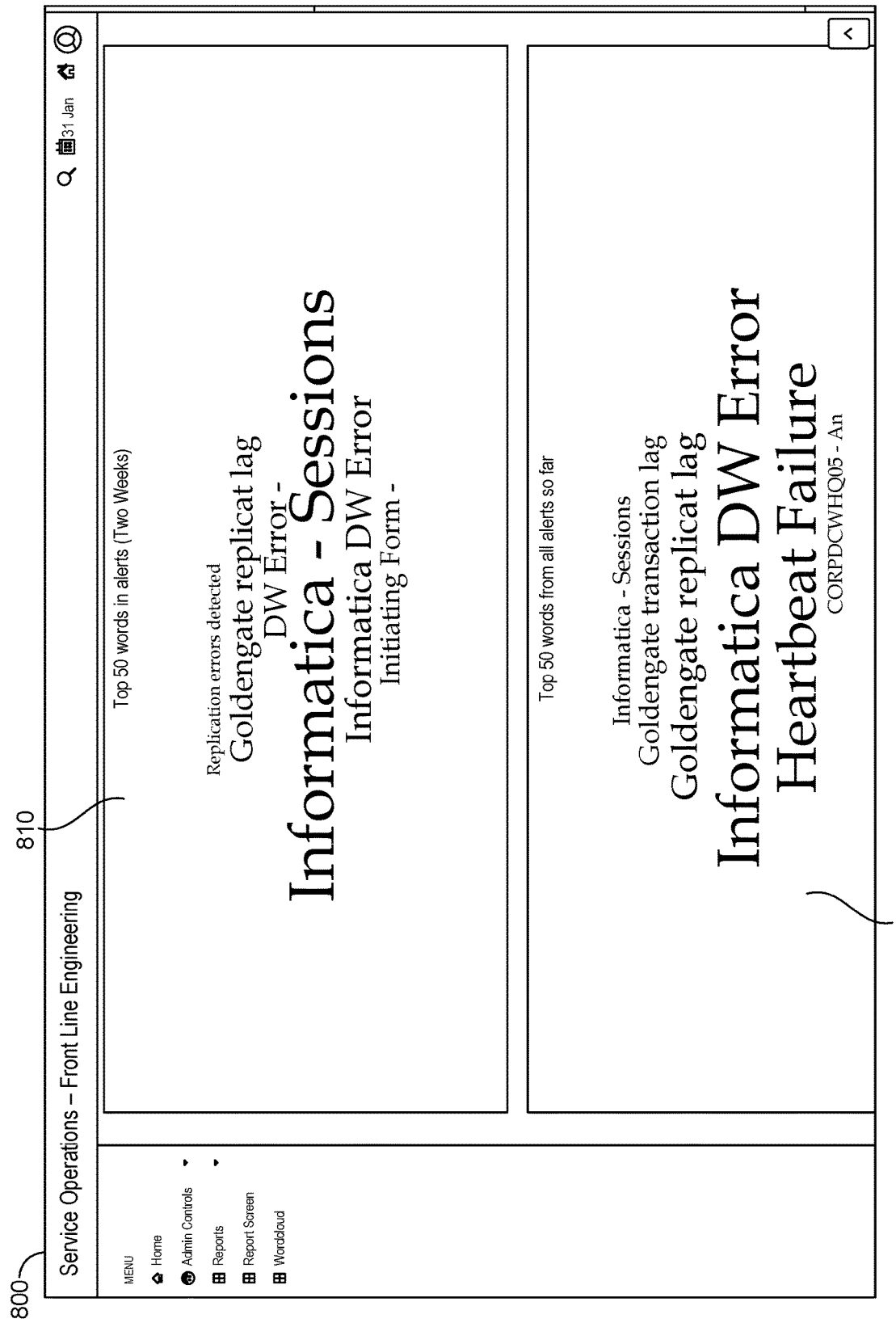

Turning now to FIG. 8, user interface 800 illustrates wordcloud reports. As shown, wordcloud report 810 identifies the top 50 words in all alerts over the two previous weeks. Similarly, wordcloud report 820 identifies the top 50 words in all alerts since the interactive web-based alerts system was brought online. The wordcloud reports provide a visual representation that helps a user readily identify the most frequently used words in alerts over a particular period of time.

Figure 9:
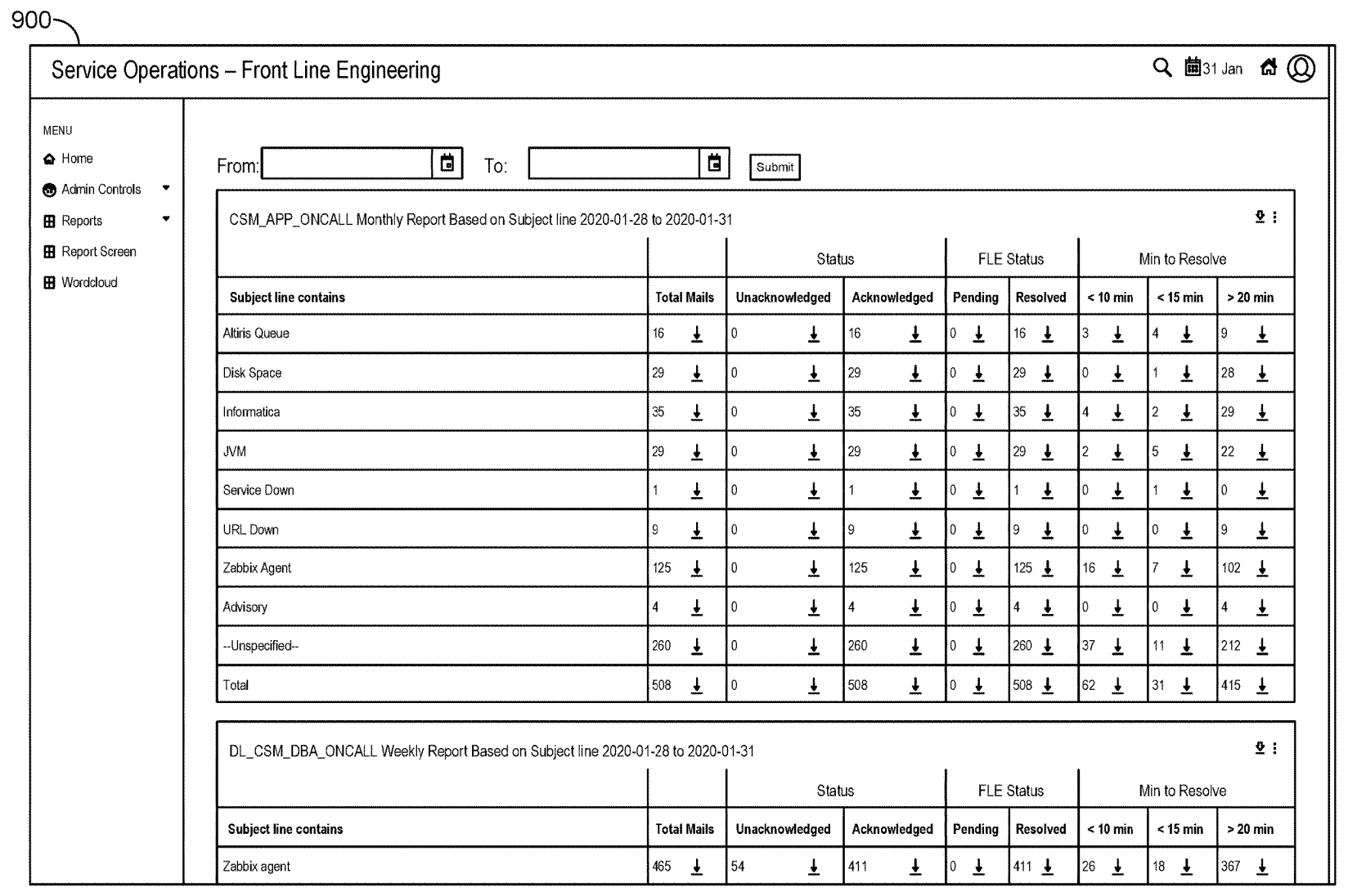

Referring to FIG. 9, user interface 900 illustrates a custom report. As illustrated, the custom report enables a user to generate reports based on a particular time period, for a particular word appearing in the subject line of the alert, or addressed to a particular user or role. The report may indicate the total number of emails corresponding to each alert, a status indicating whether the alert has been unacknowledged or acknowledged, a frontline engineering status indicating whether the alert is pending or resolved, and a time to resolve indication.

Figure 10:
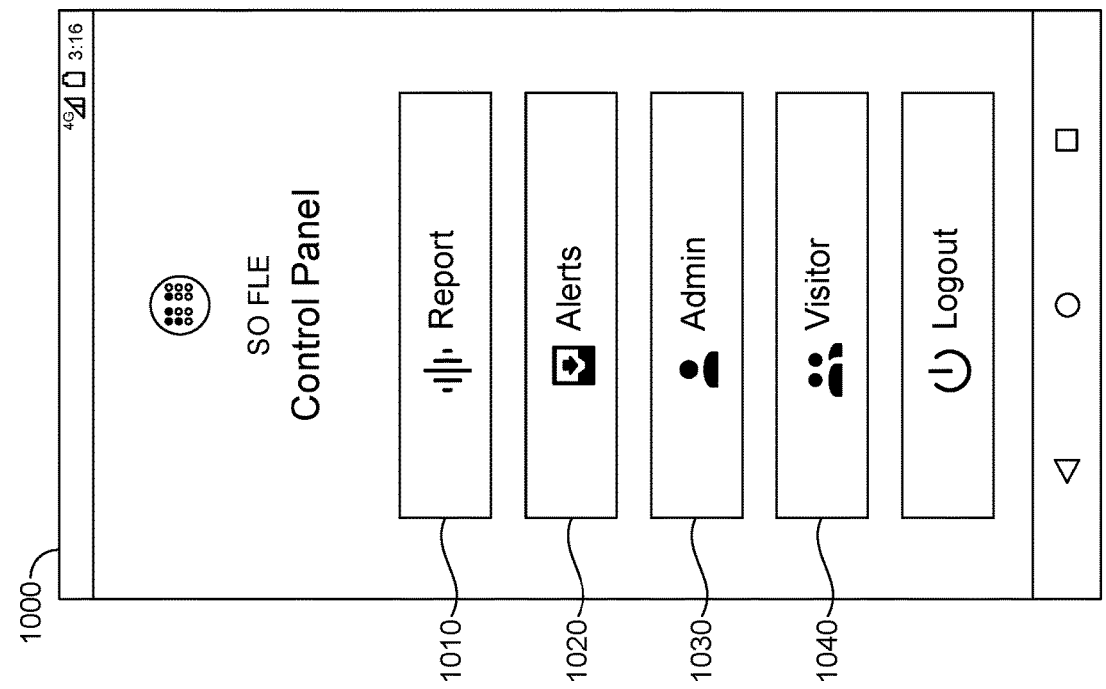

In FIG. 10, user interface 1000 illustrates a mobile application control panel. As shown, the user may select a variety of options. Report button 1010 enables a user to generate or view reports, such as the reports described above. Alerts button 1020 enables the user to view or interact with alerts. The admin button 1030 enables the user to login with heightened privileges such as may be required to set business requirements for reports, configure connectivity between monitoring tools and the interactive web-based alerts system, assign privileges or provide access to other users, and the like. Visitor button 1040 may provide a user that does not have privileges or access to the interactive web-based alerts system with limited access to the dashboard.

Figure 11:
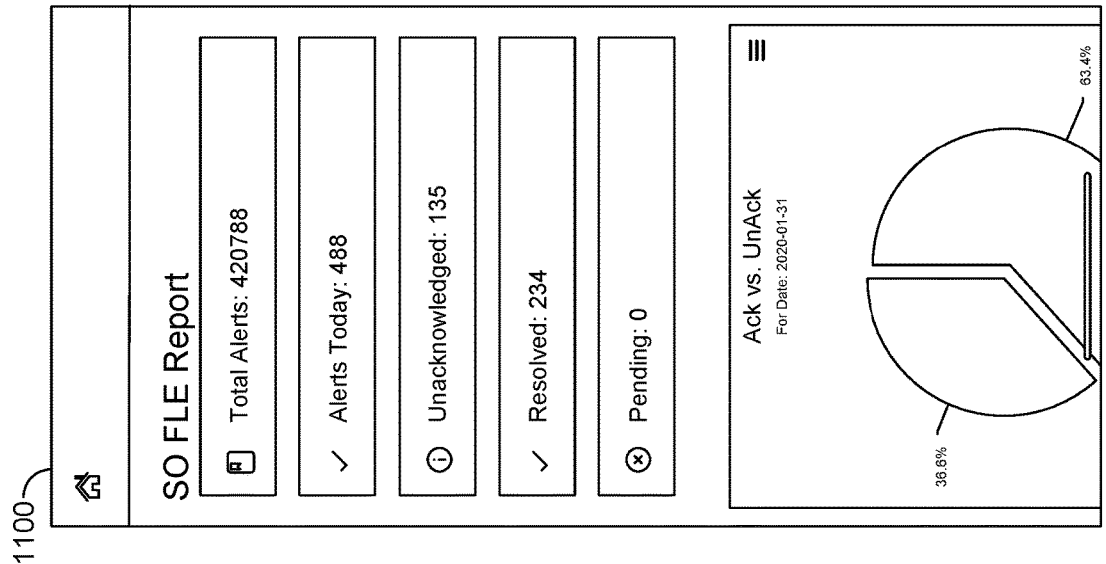

Turning now to FIG. 11, user interface 1100 depicts a mobile application homepage generated by the interactive web-based alerts system. As illustrated, the user interface 1100 indicates a total number of alerts, a number of alerts for the current day, a number of unacknowledged alerts, a number of resolved alerts, and a number of pending alerts. The homepage may also include a graphical representation that illustrates a number of acknowledged versus unacknowledged alerts.

Figure 13:
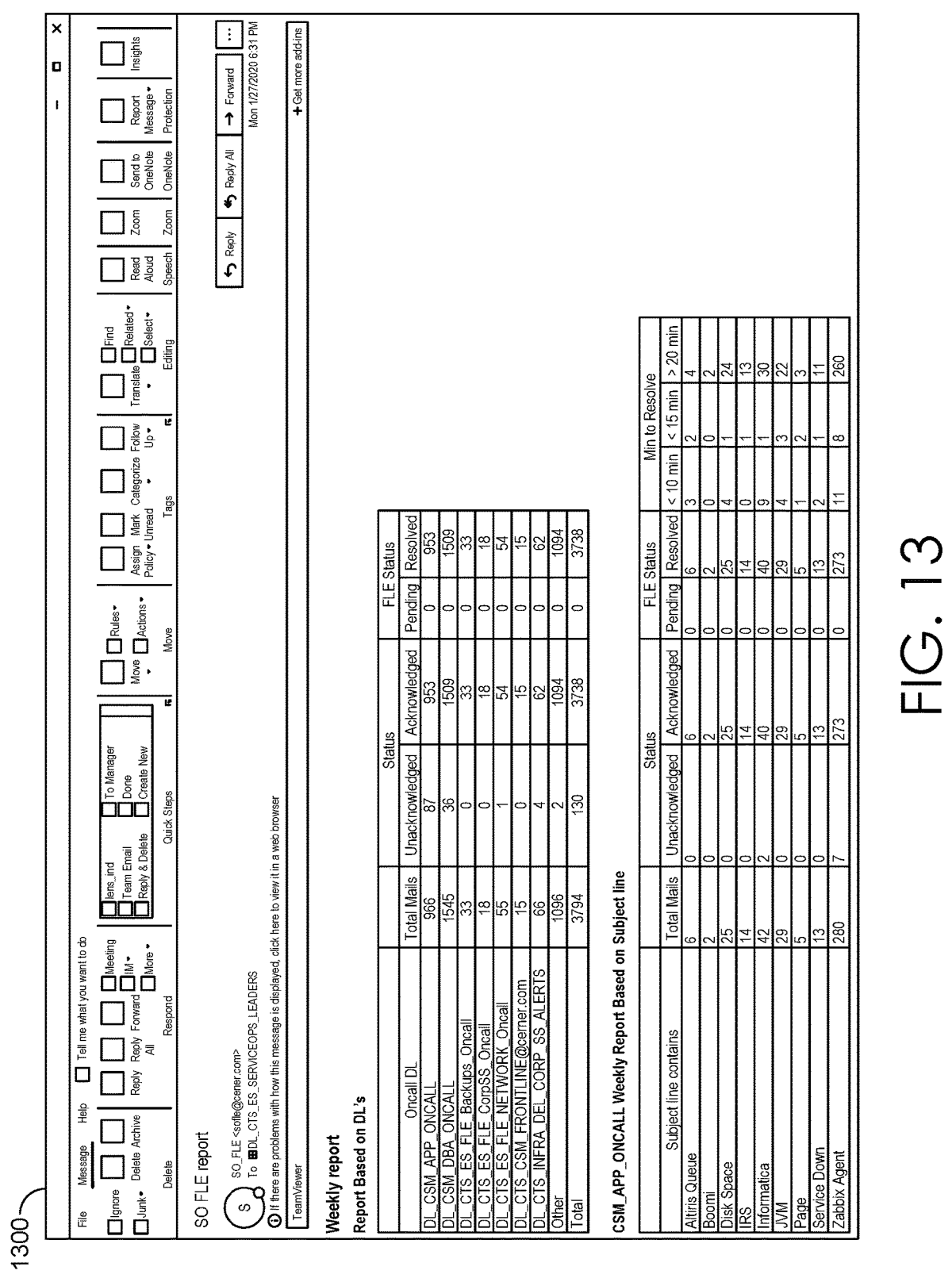

Referring to FIGS. 12-13, user interfaces 1200, 1300 illustrate a sample report corresponding to a period of time. For example, user interface 1200 illustrates a 12 hour shift report. As shown, the report identifies alerts that were addressed to applications engineers, database administrators, backup administrators, security administrators, network administrators, frontline engineers, and the like. The report may indicate the total number of emails corresponding to each alert, a status indicating whether the alert has been unacknowledged or acknowledged, and a frontline engineering status indicating whether the alert is pending or resolved. Additionally, the report may also indicate the number of issues assigned to each user, including the issues that are currently unacknowledged.

In another example, user interface 1300 illustrates a weekly report. As shown, the report identifies alerts that were addressed to applications engineers, database administrators, backup administrators, security administrators, network administrators, frontline engineers, and the like. The report may indicate the total number of emails corresponding to each alert, a status indicating whether the alert has been unacknowledged or acknowledged, and a frontline engineering status indicating whether the alert is pending or resolved.

The weekly report may also include alerts based on the subject line of the alerts. The report may indicate the total number of emails corresponding to each alert, a status indicating whether the alert has been unacknowledged or acknowledged, a frontline engineering status indicating whether the alert is pending or resolved, and a time to resolve indication.

Figure 14:
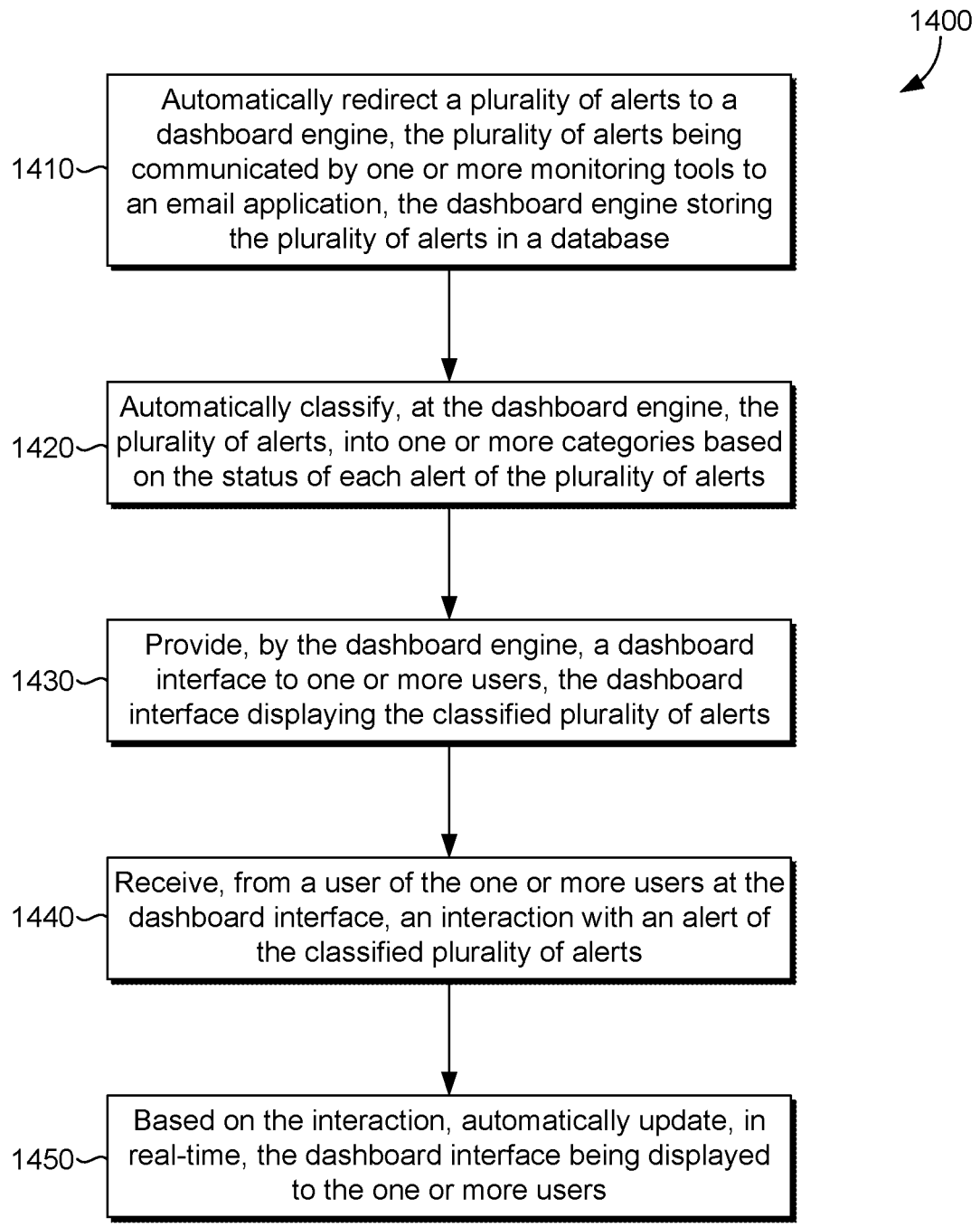
FIG. 14 is a flow diagram showing an exemplary method for creating key notes, in accordance with various embodiments of the present invention.

Turning now to FIG. 14, a flow diagram is provided illustrating a method 1400 for providing an interactive web-based alerts system, in accordance with an embodiment of the present invention. Method 1400 may be performed by any computing device (such as computing device described with respect to FIG. 1) with access to an interactive web-based alerts system (such as the one described with respect to FIG. 2) or by one or more components of the interactive web-based alerts system.

Initially, as shown at step 1410, a plurality of alerts communicated by one or more monitoring tools to an email application is automatically redirected to a dashboard engine. The dashboard engine stores the plurality of alerts in a database. The plurality of alerts may correspond to one or more of: CPU, memory, disk space, or network interface usage. In some embodiments, the plurality of alerts is redirected in real-time. In other embodiments, the plurality of alerts is redirected based on an automated script that is scheduled by the user.

At step 1420, the plurality of alerts is automatically classified at the dashboard engine into one or more categories based on the status of each alert of the plurality of alerts. The one or more categories may comprise: pending status, resolved status, acknowledged status, or unacknowledged status.

At step 1430, a dashboard interface is provided by the dashboard engine to one or more users. The dashboard interface displays the classified plurality of alerts.

At step 1440, an interaction with an alert of the classified plurality of alerts is received from a user of the one or more users at the dashboard interface. In some embodiments, the interaction causes a report to be generated. The report may be automatically generated based on a business requirement. In other words, business requirements may define the type or configuration of the report, such that when the interaction is received, the report is automatically generated.

In some embodiments, the interaction causes an incident to be created for the alert. For example, the interaction may be integrated with an incident management system such that when the interaction is received, instructions are provided to the incident management system that enables the incident to be created. In other embodiments, the interaction causes a category of the alert to be updated or a shift report to be generated.

At step 1450, based on the interaction, the dashboard interface being displayed to the one or more users is automatically updated, in real-time. This enables all e-mails and/or alerts to be accessed in an integrated web-based alerts system, without having the e-mails or alerts segregated by different folders. In this way, all e-mails and/or alerts can be accessed through a centralized database. Moreover, reports can be viewed in the dashboard and daily/weekly e-mails can be sent in a timely manner. Additionally, the generation of associate-based shift reports is facilitated within the dashboard and alert turn-around time can easily be mapped.

Incidents can be created with the click of a button using APIs that have been integrated into the dashboard.

As can be understood, the present invention provides systems, methods, and user interfaces for providing an interactive production alerts dashboard. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. One or more computer storage media having computer-executable instructions embodied thereon, that when executed, cause performance of operations, the operations comprising:
   automatically redirecting a plurality of automated emails to a dashboard engine, the plurality of automated emails being generated by one or more monitoring tools and communicated to an email application, the dashboard engine storing the plurality of automated emails in a database;
   automatically classifying, at the dashboard engine, the plurality of automated emails, into one or more categories based on the status of each automated email of the plurality of automated emails;
   providing, by the dashboard engine, a dashboard interface to one or more users, the dashboard interface displaying the classified plurality of automated emails;
   receiving, from a user of the one or more users at the dashboard interface, an interaction with an automated email of the classified plurality of automated emails; and
   based on the interaction with the automated email, automatically causing an incident to be created within an incident management system and updating, in real-time, the dashboard interface being displayed to the one or more users.

2. The media of claim 1, wherein the interaction causes a report to be generated.

3. The media of claim 2, wherein the report is automatically generated based on a business requirement.

4. The media of claim 1, wherein the interaction causes a category of the automated email to be updated.

5. The media of claim 1, wherein the interaction causes a shift report to be generated for the user.

6. The media of claim 1, wherein the plurality of automated emails is automatically redirected in real-time.

7. The media of claim 1, wherein the plurality of automated emails is redirected based on an automated script that is scheduled by the user.

8. The media of claim 1, wherein the one or more categories comprise: pending status, resolved status, acknowledged status, or unacknowledged status.

9. The media of claim 1, wherein the plurality of automated emails correspond to one or more of: CPU, memory, disk space, or network interface usage.

10. A computerized method comprising:
    automatically redirecting a plurality of automated emails to a dashboard engine, the plurality of automated emails being generated by one or more monitoring tools and communicated to an email application, the dashboard engine storing the plurality of automated emails in a database;

automatically classifying, at the dashboard engine, the plurality of automated emails, into one or more categories based on the status of each automated email of the plurality of automated emails;

providing, by the dashboard engine, a dashboard interface to one or more users, the dashboard interface displaying the classified plurality of automated emails;

receiving, from a user of the one or more users at the dashboard interface, an interaction with an automated email of the classified plurality of automated emails, the interaction with the automated email causing one or more of: a report to be automatically generated based on a business requirement, an incident to be created within an incident management system, a category of the automated email to be updated, or a shift report to be generated; and based on the interaction with the automated email, automatically updating, in real-time, the dashboard interface being displayed to the one or more users.

11. The media of claim 10, wherein the plurality of automated emails is redirected in real-time.

12. The media of claim 10, wherein the plurality of automated emails is redirected based on an automated script that is scheduled by the user.

13. The media of claim 10, wherein the one or more categories comprise: pending status, resolved status, acknowledged status, or unacknowledged status.

14. The media of claim 10, wherein the plurality of automated emails correspond to one or more of: CPU, memory, disk space, or network interface usage.

15. A computerized system comprising:
one or more processors; and
a non-transitory computer storage media storing computer-useable instructions that, when used by the one or more processors, cause the one or more processors to:
automatically redirect a plurality of automated emails to a dashboard engine, the plurality of automated emails being generated by one or more monitoring tools and communicated to an email application, the dashboard engine storing the plurality of automated emails in a database;
automatically classify, at the dashboard engine, the plurality of automated emails, into one or more categories based on the status of each automated email of the plurality of automated emails;
provide, by the dashboard engine, a dashboard interface to one or more users, the dashboard interface displaying the classified plurality of automated emails;
receive, from a user of the one or more users at the dashboard interface, an interaction with an automated email of the classified plurality of automated emails, wherein the interaction with the automated email causes one or more of: a report to be automatically generated based on a business requirement, an incident to be created within an incident management system, a category of the alert to be updated, or a shift report to be generated; and
based on the interaction with the automated email, automatically update, in real-time, the dashboard interface being displayed to the one or more users.

16. The media of claim 15, wherein the plurality of automated emails is automatically redirected in real-time or based on an automated script that is scheduled by the user.

17. The media of claim 15, wherein the one or more categories comprise: pending status, resolved status, acknowledged status, or unacknowledged status.

18. The media of claim 15, wherein the plurality of automated emails correspond to one or more of: CPU, memory, disk space, or network interface usage.

* * * * *